Dec. 14, 1926.

J. L. RICHTER

AUTOMATIC AUXILIARY VALVE FOR PIPE LINES

Filed Oct. 1, 1925

1,610,474

INVENTOR
*J. L. Richter*
BY
ATTORNEY

Patented Dec. 14, 1926.

1,610,474

UNITED STATES PATENT OFFICE.

JOHN L. RICHTER, OF RIPON, CALIFORNIA, ASSIGNOR OF ONE-HALF TO LEOPOLD W. RICHTER, OF SACRAMENTO, CALIFORNIA.

AUTOMATIC AUXILIARY VALVE FOR PIPE LINES.

Application filed October 1, 1925. Serial No. 59,780.

This invention relates to improvements in plumbing accessories, and particularly to an automatic valve adapted to be associated with standard valves, stop cocks, faucets and the like as used in water, steam, compressed air or any other fluid supply lines.

The fiber, rubber, or composition gaskets or even the all-metal valves, which form the closure members of the majority if not all of the faucets and cocks used in ordinary water-pressure piping systems sooner or later become worn so that the faucets are not water-tight, resulting in a constant dropping of water therefrom, which is not only a waste of water but is very often a source of annoyance on account of the continual noise made by the drops when they strike. In any event, such leakage is undesirable.

Heretofore, it has been necessary, in order to replace or repair the leaky members, to shut off the water pressure of the building. In the case of the average residence, this means going into the basement, if such exists, or crawling under the house, which is a very inconvenient and dirty job in a good many instances.

In office buildings and the like, the main valve is usually handier, but its shutting off cuts the water supply off from at least an entire floor at a time, to the inconvenience of the tenants.

The principal object of my invention is to eliminate the above inconveniences by providing an automatic shut off valve so designed that it will automatically shut off the flow of the water from a faucet or the like when the faucet valve and its stem are removed from the body of the faucet in the usual manner.

Any leaky valve can therefore be easily replaced at any time without shutting off the main water supply.

My automatic valve may also be incorporated in connection with ordinary unions to cause the water or other fluid to be automatically stopped from flowing through the pipes only when and as soon as the parts of the union are disassociated from each other.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
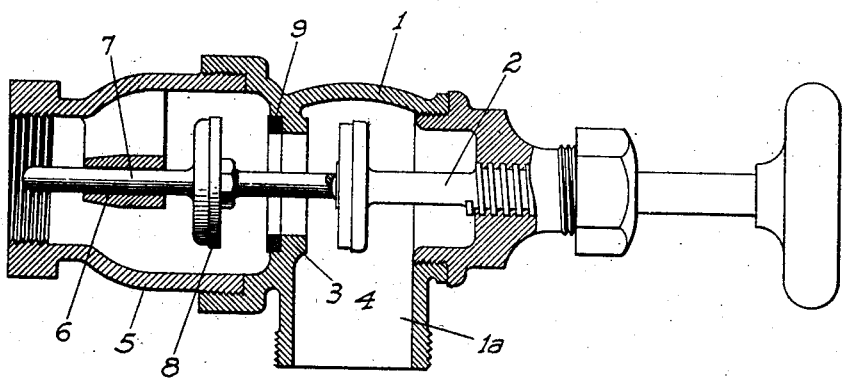
Fig. 1 is a sectional elevation of a valve of standard type showing my automatic valve incorporated therewith, both valves being open.
Figure 2:
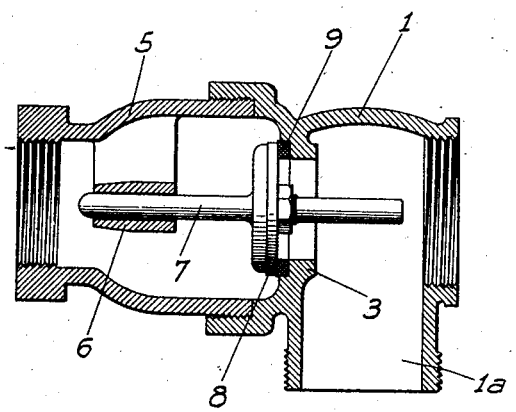
Fig. 2 is a similar view with the main valve removed from the body, and the auxiliary valve closed.

Referring now more particularly to the characters of reference on the drawings, and particularly at this time to Figs. 1 and 2, the main valve comprises a body 1 having a valve stem 2 threaded through one end of the body for movement to and from an orificed wall 3, which is formed with a seat for a valve 4 mounted on the inner end of the stem 2. A lateral outlet $1^a$ leads from the body inwardly of the wall 3. Such parts are standard and their particular arrangement form of themselves no part of my invention.

Fitted into the body outwardly of the wall 3 is a tubular extension 5, tapered or threaded at its outer end for suitable connection to a pipe line.

Projecting into the member 5 in spaced relation to the wall 3 is a centrally disposed boss 6 forming a bearing for a slidable stem 7 which is centrally alined with the wall 3. On this stem intermediate its ends is fixed a valve disc 8 adapted to close the opening in the wall 3 on the opposite side thereof from the valve 4. To insure the proper closing even though not used for a long time, the valve 8 is preferably made of lead, fiber, or some other non-corrosive, while the cooperating seat in the wall 3 is formed of a ring 9 of similar material. The stem 7 ahead of the valve 8 is always engaged by the valve 4, the fluid pressure behind the valve 8 tending to force it toward its seat in the wall 3. The length of the stem 7 ahead of the valve 8 is such however that even when the valve 4 is fully opened, said valve 8 is well clear of the seat 9 so as not to interfere with the free flow of the fluid through the intake opening in the wall 3.

When the valve 4 is closed the valve 8 is simply moved further away from the wall 3, as will be evident.

When the valve 4 and its stem are removed from the body for replacement of the valve, the holding back pressure against the stem 7 is of course removed. This allows the valve 8 to engage the seat 9, which engagement is maintained by the fluid pressure behind said valve.

Though I have shown and described a particular form of main valve it will be evident that my auxiliary valve may be applied with equal effect to valves of various different types, and is not limited in its application to the above described type of valve alone.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

In combination with a valve structure comprising a body member, an orificed end wall provided with the body member to form a double valve seat, an outlet from the body member in front of said end wall, and a manually controlled valve detachably mounted on the body for engagement with the inner face of the orificed end wall; a tubular extension separate from but connected to the body outwardly of the end wall and at right angles thereto, the outer end of said extension being arranged for connection to an intake pipe, a relatively small stem disposed centrally in the extension and projecting through the body wall for engagement with the valve, guide and supporting means for the stem formed integral with and projecting into the extension, and a valve head to engage the outer face of the body wall, mounted on the stem between said wall and the stem supporting means.

In testimony whereof I affix my signature.

JOHN L. RICHTER.